(No Model.)
J. GAMMON.
BURNER FOR BURNING GASEOUS FUEL.
No. 460,334. Patented Sept. 29, 1891.
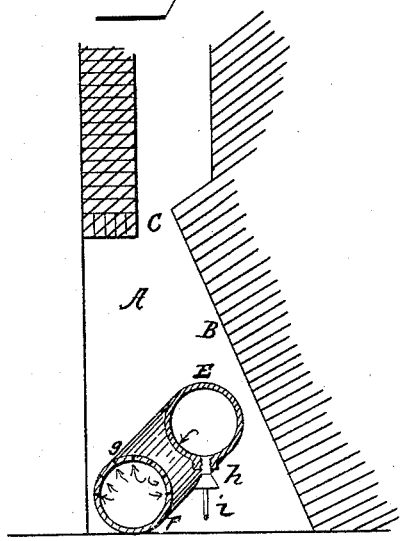
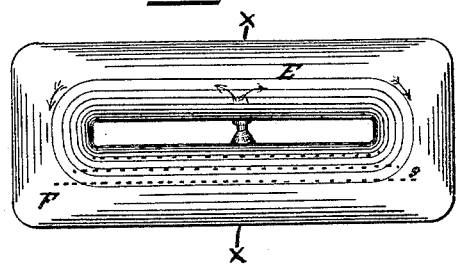

UNITED STATES PATENT OFFICE.

JAMES GAMMON, OF PITTSBURG, PENNSYLVANIA.

BURNER FOR BURNING GASEOUS FUEL.

SPECIFICATION forming part of Letters Patent No. 460,334, dated September 29, 1891.

Application filed June 6, 1890. Serial No. 354,507. (No model.)

*To all whom it may concern:*

Be it known that I, JAMES GAMMON, of Pittsburg, in the county of Allegheny and State of Pennsylvania, have invented a new and useful Improvement in Burners for Burning Gaseous Fuel; and I do hereby declare the following to be a full, clear, and exact description thereof.

My invention relates to an improvement in burners for burning gaseous fuel; and it consists of the combination consisting of an upper chamber adapted to receive air and gas, a gas and air mixer communicating with and supplying said upper chamber with mixed air and gas, a lower chamber provided with mixed air and gas exits, and channels of communication leading from the upper chamber to the lower chamber.

To enable others skilled in the art with which my invention is most nearly connected to make and use it, I will proceed to describe its construction and operation.

In the accompanying drawings, which form part of my specification, Figure 1 is a view of a fire-place with my improved gas-burner arranged therein, the burner shown being a cross-section at line $x$ $x$ of Fig. 2. Fig. 2 is a plan view of my improved gas-burner.

In the drawings, A is a fire-place having an inclined back wall B and a throat or outlet C, all of which are of ordinary construction. Within the fire-place A, I arrange the gas-burner, which consists of two chambers E F, the chamber E being arranged on a plane above the chamber F. To the chamber E is attached the mixer $h$, into which enters the gas-supply pipe $i$. The lower chamber F is provided with a large number of openings $g$ for the outlet of gas, all of which is clearly shown in the accompanying drawings.

The operation of my improvement is as follows: Gas passing through the pipe $i$ through the mixer $h$ will draw sufficient atmospheric air up through the mixer to form combustion, and the commingled air and gas entering the chamber E will become thoroughly mixed and passing right and left, as indicated by the arrows in Fig. 2, will enter the chamber F, and passing out of the openings $g$ is ignited, and the flame and heat from the ignited gas will impinge upon and heat the upper chamber E and its contents, thereby superheating the same. A gas-burner constructed as shown will be very cheap, it being cast in one piece, and will be very economical in the consumption of gas.

What I claim is—

In a gas-burner, the combination of an upper chamber adapted to receive air and gas, a gas and air mixer communicating with and supplying said upper chamber with mixed air and gas, a lower chamber provided with mixed air and gas exits, and channels of communication leading from the upper chamber to the lower chamber, substantially as shown and described.

In testimony whereof I have hereunto set my hand this 23d day of October, A. D. 1889.

JAS. GAMMON.

Witnesses:
A. C. JOHNSTON,
I. C. JOHNSTON.